(12) United States Patent
Eguchi

(10) Patent No.: US 9,541,051 B2
(45) Date of Patent: Jan. 10, 2017

(54) IGNITION CONTROL DEVICE FOR ENGINE

(71) Applicant: SUZUKI MOTOR CORPORATION, Shizuoka-Ken (JP)

(72) Inventor: Takuya Eguchi, Shizuoka-Ken (JP)

(73) Assignee: Suzuki Motor Corporation (JP)

( * ) Notice: Subject to any disclaimer, the term of this patent is extended or adjusted under 35 U.S.C. 154(b) by 13 days.

(21) Appl. No.: 14/538,878

(22) Filed: Nov. 12, 2014

(65) Prior Publication Data

US 2015/0128577 A1    May 14, 2015

(30) Foreign Application Priority Data

| Nov. 13, 2013 | (JP) | ................................. 2013-235331 |
| Nov. 13, 2013 | (JP) | ................................. 2013-235332 |
| Nov. 13, 2013 | (JP) | ................................. 2013-235333 |

(51) Int. Cl.
| *F01N 3/00* | (2006.01) |
| *F02P 15/02* | (2006.01) |
| *F02D 41/08* | (2006.01) |
| *F02D 41/14* | (2006.01) |
| *F02P 5/04* | (2006.01) |
| *F02P 15/08* | (2006.01) |
| *F02D 37/02* | (2006.01) |
| *F01N 3/30* | (2006.01) |
| *F01N 9/00* | (2006.01) |
| *F02P 5/15* | (2006.01) |

(52) U.S. Cl.
CPC ................. *F02P 15/02* (2013.01); *F01N 3/30* (2013.01); *F01N 9/00* (2013.01); *F02D 37/02* (2013.01); *F02D 41/08* (2013.01); *F02D 41/1454* (2013.01); *F02P 5/045* (2013.01); *F02P 5/1508* (2013.01); *F02P 15/08* (2013.01); *F02D 2200/0404* (2013.01); *F02D 2200/101* (2013.01); *Y02T 10/20* (2013.01); *Y02T 10/46* (2013.01); *Y02T 10/47* (2013.01)

(58) Field of Classification Search
CPC ...... F01N 3/30; F01N 9/00; F02D 2200/0404; F02D 2200/101; F02D 37/02; F02D 41/08; F02D 41/1454; F02P 15/02; F02P 15/08; F02P 5/045; F02P 5/1508
USPC .................................................. 60/276, 285
See application file for complete search history.

(56) References Cited

U.S. PATENT DOCUMENTS

| 4,202,306 A | * | 5/1980 | Nakajima | ................. F02B 1/02 123/310 |
| 5,727,522 A | * | 3/1998 | Otani | .................... F02P 5/1508 123/339.11 |

(Continued)

FOREIGN PATENT DOCUMENTS

| JP | 05-141336 | * | 6/1993 | ............. F02P 15/08 |
| JP | 2004112969 A | | 4/2004 | |

*Primary Examiner* — Audrey K Bradley
*Assistant Examiner* — Diem Tran
(74) *Attorney, Agent, or Firm* — Barnes & Thornburg LLP

(57) ABSTRACT

An ignition control device for an engine provided with ignition plugs for each cylinder. The ignition control device includes a sensor that detects a signal that determines whether the engine is in an idling state or not, and an ignition control unit that determines whether the engine is in the idling state on the basis of a signal from the sensor and controls the ignition plugs to be simultaneously ignited if the engine is in the idling state, and controls part of the ignition plugs to be ignited if the engine is in a state other than the idling state.

4 Claims, 10 Drawing Sheets

(56) References Cited

U.S. PATENT DOCUMENTS

| | | | | |
|---|---|---|---|---|
| 6,295,966 B1 * | 10/2001 | Ishii | .................... | F02P 5/1508 |
| | | | | 123/339.11 |
| 6,499,456 B1 * | 12/2002 | Nogi | ...................... | F02B 1/12 |
| | | | | 123/295 |
| 8,176,893 B2 * | 5/2012 | Glugla | ................ | F02D 35/028 |
| | | | | 123/310 |
| 2003/0196636 A1 * | 10/2003 | Ashida | ................. | F02B 31/04 |
| | | | | 123/310 |

* cited by examiner $D_1$ : SPECIFIED AMOUNT OF OXYGEN CONCENTRATION

IGNITION CONTROL DEVICE FOR ENGINE

PRIORITY CLAIM

This patent application claims priority to Japanese Patent Application Nos. 2013-235331, filed 13 Nov. 2013; 2013-235332, filed 13 Nov. 2013; and 2013-235333, filed 13 Nov. 2013, the disclosure of which is incorporated herein by reference in their entirety.

BACKGROUND OF THE INVENTION

1. Field of the Invention

The present invention relates to an ignition control device for an engine provided with a plurality of ignition plugs for each cylinder.

2. Description of the Related Art

Heretofore, there has been proposed an engine provided with two ignition plugs for each cylinder (refer to Patent Document 1 (Japanese Patent Laid-Open No. 4-112069)). In such an engine, when the engine runs at low speed, one ignition plug is ignited, and when the engine runs at high speed, two ignition plugs are simultaneously ignited to increase a combustion speed at each cylinder. As a result, combustion pressure is increased to thereby improve an engine output.

Unfortunately, in a case where one ignition plug is ignited when an engine runs at low speed, for example, the amount of non-combustion gas may increase. Thus, a secondary air supply device for supplying a part of intake air as secondary air to an exhaust pipe, or a fuel injection device that adjusts fuel injection quantity is operated to reduce the amount of non-combustion gas. However, such a device may not sufficiently clean up exhaust gas.

Furthermore, when an engine runs at high speed, a combustion speed of a gaseous mixture in a combustion chamber increases as an intake air speed increases. At the time, if two ignition plugs are simultaneously ignited, the combustion speed may be excessively increased to cause a noise such as a piston hammering sound to be increased.

Further, when an engine runs at high speed, a combustion speed of a gaseous mixture in a combustion chamber increases as an intake air speed increases. At the time. If two ignition plugs are simultaneously ignited, the combustion speed may be excessively increased to cause a noise such as a piston hammering sound to be increased. In addition, at the time, if two ignition plugs are simultaneously ignited, the combustion speed may be excessively increased to cause a noise such as a piston hammering sound to be increased.

SUMMARY OF THE INVENTION

The present invention has been conceived and made in consideration of the above-mentioned circumstances, and an object of the present invention is to provide an ignition control device for an engine capable of improving performance to clean up exhaust gas and also capable of reducing, for example, a noise during acceleration at the time of starting.

The above and other objects can be achieved according to the present invention by providing, in one aspect, an ignition control device for an engine provided with a plurality of ignition plugs for each cylinder, the ignition control device comprising a sensor that detects a signal that determines whether the engine is in an idling state or not, and an ignition control unit that determines whether the engine is in the idling state on the basis of a signal from the sensor and controls the plurality of ignition plugs to be simultaneously ignited if the engine is in the idling state, and controls part of the plurality of ignition plugs to be ignited if the engine is in a state other than the idling state.

In a preferred embodiment of this aspect, two ignition plugs may be provided for each cylinder and the ignition control unit determines whether the engine is in the idling state on the basis of a signal from the sensor and controls two ignition pings to be simultaneously ignited if the engine is in the idling state, and controls one ignition plug to be ignited if the engine is in a state other than the idling state.

It may be preferred that the sensor is an engine speed sensor for detecting engine speed. The sensor may be a throttle opening sensor for detecting opening of a throttle valve that adjusts air intake quantity to the engine.

According to the present invention of the above aspect, since a plurality of ignition plugs are simultaneously ignited when the engine runs at the idling engine speed, the combustion speed in each cylinder increases to allow non-combustion gas to be reduced. Thus, the clean-up performance of the exhaust gas during the idling operation can be improved.

In addition, since part of the plurality of ignition plugs is ignited in a state other than the idling of the engine, it is possible to prevent the excessive increase in the combustion speed, as compared with a state where a plurality of ignition plugs are simultaneously ignited in each cylinder. As a result, it is possible to reduce a noise during acceleration at the time of starting.

The above and other objects can be also achieved according to the present invention by providing, in another aspect, an ignition control device for an engine provided with a plurality of ignition plugs for each cylinder, the ignition control device comprising a secondary air supply unit that supplies secondary air to an exhaust passage of the engine when the engine runs at low speed, and an ignition control unit that controls the plurality of ignition plugs to be simultaneously ignited when the secondary air supply unit supplies secondary air, and that controls part of the plurality of ignition, plugs to be ignited when the secondary air supply unit stops supply of the secondary air.

In a preferred embodiment of this aspect, two ignition plugs may be provided for each cylinder, and the ignition control unit controls two ignition plugs to be simultaneously ignited when the secondary air supply unit supplies secondary air, and that controls one ignition plug to be ignited when the secondary air supply unit stops supply of the secondary air. It may be further preferred that the secondary air supply unit is configured to supply secondary air and stop supply of the secondary air on the basis of engine speed and throttle opening.

According to the present invention of the above another aspect, since a plurality of ignition plugs are simultaneously ignited when the secondary air is supplied by the secondary air supply unit, it is possible to reduce the non-combustion gas by increasing the combustion speed in each cylinder. Thus, the clean-up performance of the exhaust gas by using the secondary air can be promoted. In addition, since one of the plurality of ignition plugs is ignited when the supply of the secondary air by the secondary air supply unit is stopped, it is possible to prevent an excessive increase in the combustion speed due to simultaneous ignition of the plurality of ignition plugs when the supply of the secondary air is stopped at a time, for example, when the engine runs at high speed. Thus, a noise can be reduced.

The above and other objects can be also achieved according to the present invention by providing, in a further aspect, an ignition control, device for an engine provided with a plurality of ignition plugs for each cylinder, the ignition control device comprising an oxygen concentration sensor that detects oxygen concentration in exhaust gas of the engine, and an ignition control unit that controls the plurality of ignition plugs to be simultaneously ignited when the oxygen concentration detected by the oxygen concentration sensor is less than a specified value.

In a preferred embodiment of this aspect, it may be preferred that the ignition control unit controls part of the plurality of ignition plugs to ignite when the oxygen concentration detected by the oxygen concentration sensor is equal to or more than the specified value.

Two ignition plugs for each cylinder may be provided, and the ignition control unit that controls two ignition plugs to be simultaneously ignited when the oxygen concentration detected by the oxygen concentration sensor is less than a specified value. It may be desired that the ignition control unit controls one of the two ignition plugs to be ignited when the oxygen concentration detected by the oxygen concentration sensor is equal to or more than the specified value.

According to the present invention of the above aspect, when the oxygen concentration in exhaust gas detected by the oxygen concentration sensor is less than the specified value, a plurality of ignition plugs are simultaneously ignited, and accordingly, the combustion speed is increased at each cylinder to accelerate combustion. As a result, the amount of non-combustion gas can be reduced to thereby improve the clean-up performance of the engine exhaust gas.

The nature and further characteristic features of the present invention will be made clearer from the following descriptions made with reference to the accompanying drawings.

BRIEF DESCRIPTION OF THE DRAWINGS

In the accompanying drawings:

FIG. 2 represents characteristics in a double ignition mode and a single ignition mode to be performed by an ignition control unit shown in FIG. 1, in which

FIG. 5 represents characteristics in a double ignition mode and a single ignition mode to be performed by an ignition control unit shown in FIG. 4, in which

FIG. 8 represents a relationship between oxygen concentration in exhaust gas detected by an oxygen concentration sensor in FIG. 7 and the amount of emission of non-combustion gas, in which

DESCRIPTION OF THE PREFERRED EMBODIMENTS

Embodiments of practicing the present invention will be described hereunder with reference to the accompanying drawings.

Figure 1:
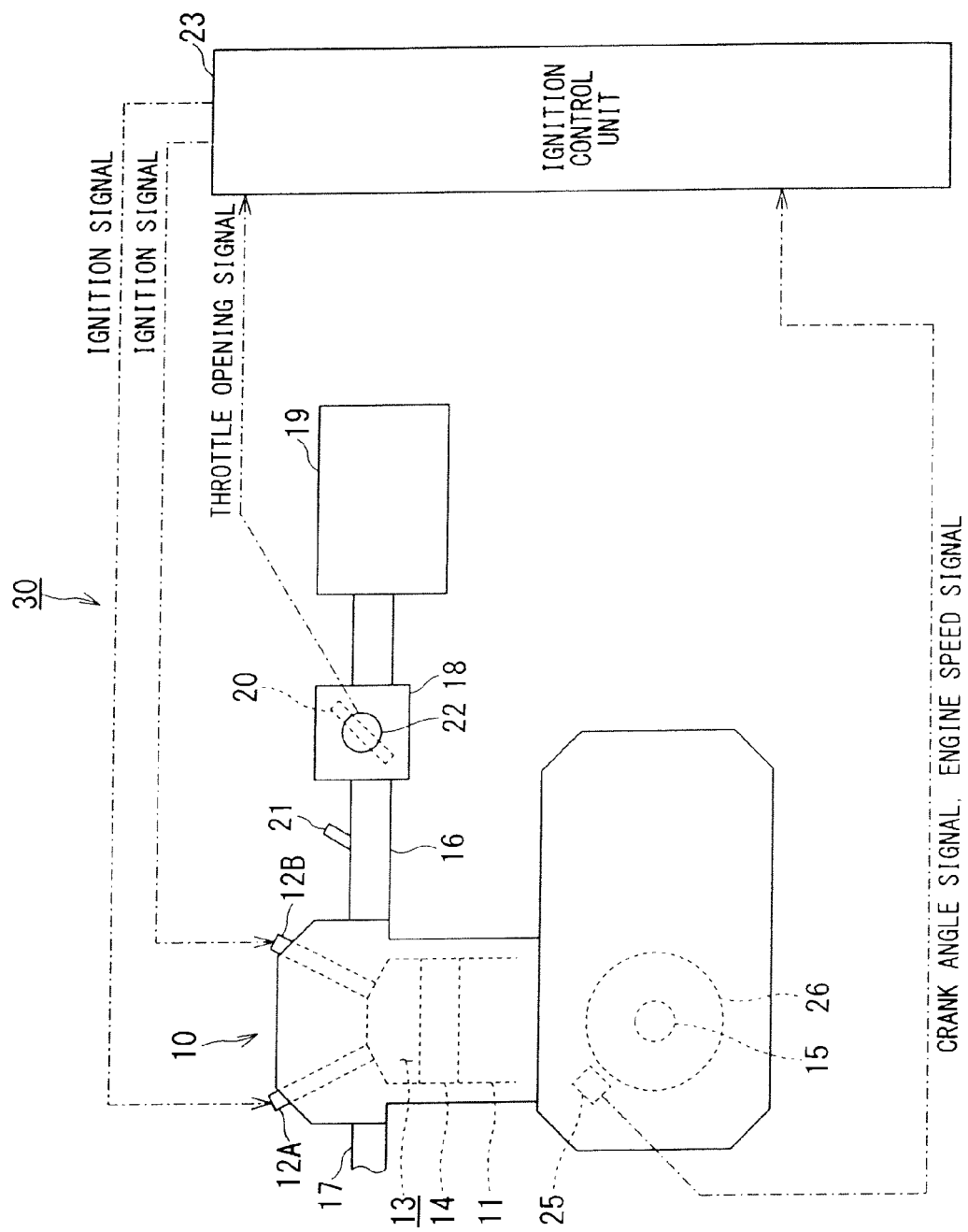
FIG. 1 is a block diagram showing one embodiment of an ignition control device for an engine in accordance with the present invention.
Figure 2A:
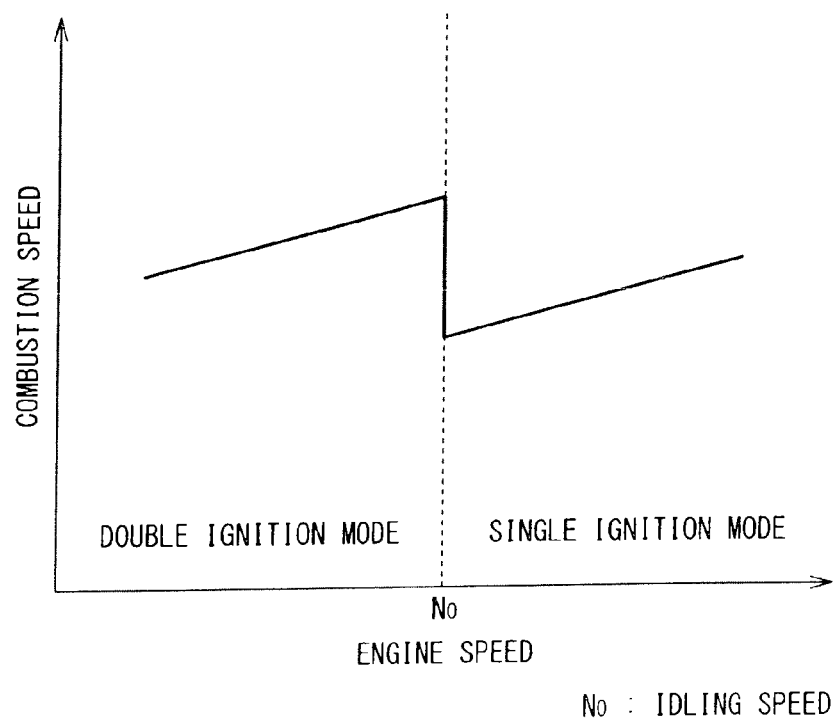
FIG. 2A is a graph representing a relationship between combustion speed and engine speed.
Figure 2B:
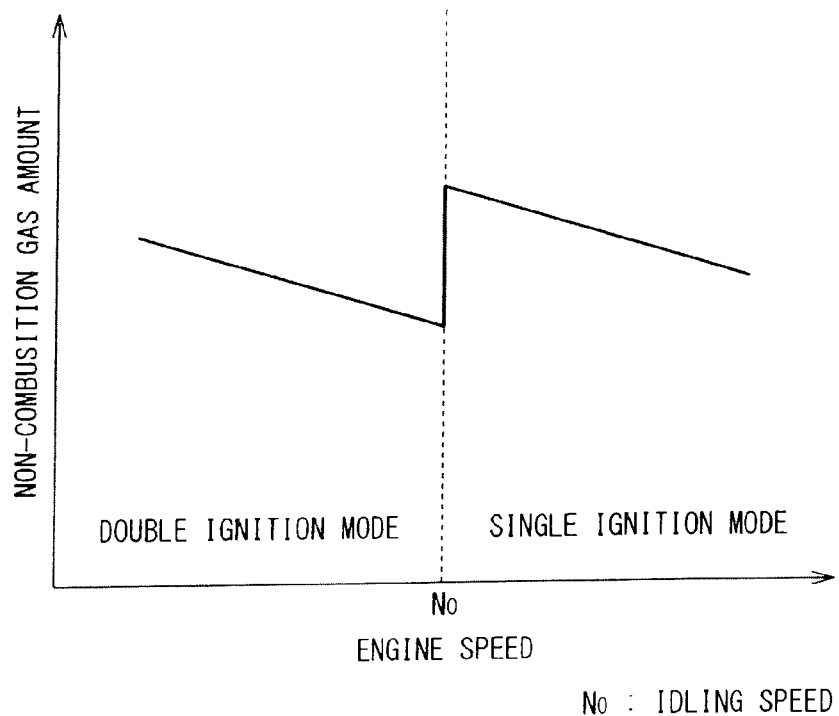
FIG. 2B is a graph representing a relationship between the amount of non-combustion gas and the engine speed.
Figure 3:
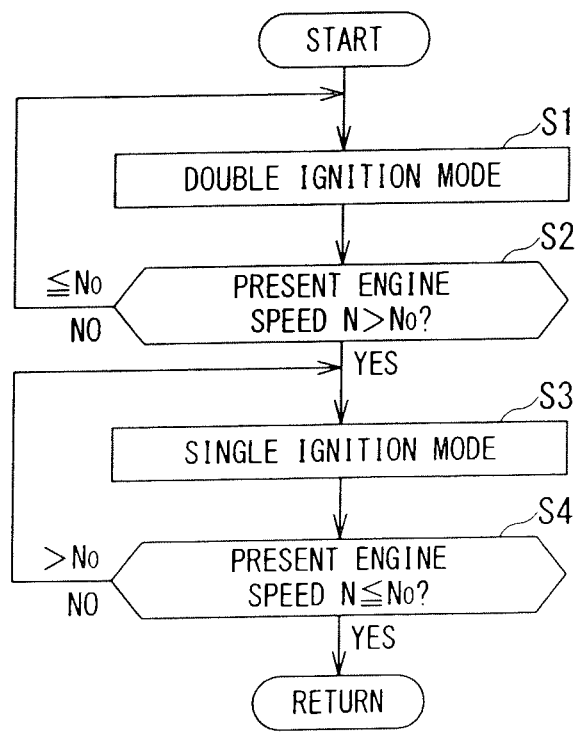
FIG. 3 is a flow chart showing an ignition operation controlled by an ignition control unit shown in FIG. 1.

FIGS. 1 to 3 represents a first embodiment of the present invention, in which an engine 10 is a 4-cycle engine provided with a single cylinder or a plurality of cylinders 11 (in the present embodiment, the single cylinder 11 is provided). In each of the cylinders 11, a piston 14 is provided, in a slidable manner, and a combustion chamber 13 is defined above the piston 14. The engine 10 of the present embodiment is provided with a plurality of ignition plugs for each of the cylinders 11, for example, two ignition plugs 12A and 12B, having tip ends positioned in the combustion chamber 13.

Although details will be described herein later, at least one of the ignition plugs 12A and 12B is ignited to burn a gaseous mixture of fuel and air in the combustion chamber 13, and the piston 14 is thereby reciprocated. Reciprocation of the piston 14 is converted into rotation by a crank shaft 15 coupled to the piston 14 so that the engine 10 outputs a driving force.

In the engine 10, an intake pipe 16 and an exhaust pipe 17 communicate with the combustion chamber 13, and a throttle body 18 and an air cleaner box 19 are connected to the intake pipe 16. The throttle body 18 is provided with a throttle valve 20 which has an opening for adjusting a flow rate (intake quantity) of air to be supplied to the combustion chamber 13 in the engine 10 from the air cleaner box 19 through the throttle body 18 and the intake pipe 16.

Further, the intake pipe 16 is provided with a fuel injection device 21, which injects fuel into air flowing in the intake pipe 16 so as to create a gaseous mixture. The gaseous mixture is burned in the combustion chamber 13 of the engine 10 by the ignition of the ignition plugs 12A and 12B to reciprocate the piston 14, so that the crank shaft 15 is rotated as well as exhaust gas is discharged through the exhaust pipe 17 and the like.

A throttle opening detecting sensor 22 for detecting the opening of the throttle valve 20 is provided for the throttle body 18. The degree of opening of the throttle valve 20. detected by the throttle opening detecting sensor 22 is sent to the ignition control unit 23 (ignition control means) as a throttle opening signal.

In addition, a crank angle sensor 25 detects a crank angle indicated as a rotation angle of the crank shaft 15. The crank angle sensor 25 is also called an engine speed sensor. A crank rotor 26 is coupled to the crank shaft 15 so as to rotate integrally therewith. Although the crank rotor 26 is provided its outer periphery with a plurality of teeth (not shown) at intervals of a predetermined crank angle (30.degree., for example), one of the teeth is missing. The crank angle sensor 25 detects the teeth of the crank rotor 26 rotating with the crank shaft 15 to detect a crank angle and an engine speed of the crank shaft 15. Signals of the crank angle and the engine speed detected by the crank angle sensor 35 are transmitted to the ignition control unit 23.

The ignition control unit 33, oxygen concentration sensor 24, and crank angle sensor 25 constitute an ignition control device 30 for the engine. The ignition control unit 23 in the ignition control device 30 for the engine judges whether the engine 10 is in an idling operation or not on the basis of a throttle opening signal from the throttle opening sensor 22 or an engine speed (revolution number) signal form the crank angle sensor 25, for example. Accordingly, the throttle opening signal from the throttle opening sensor 22 and the engine speed (revolution number) signal form the crank angle sensor 25 are signals for judging the state of the engine.

Next, the ignition control unit 23, as shown in FIG. 2, performs the double ignition mode in which the two ignition plugs 12A and 12B are simultaneously ignited during idling of the engine 10, and performs the single ignition mode in which any one of the ignition plugs 12A and 12B is ignited in a state other than idling of the engine 10.

In the double ignition mode, since the combustion speed of a gaseous mixture increases in the combustion chamber 13 of the cylinder 11, the amount of non-combustion gas such as HC and CO decreases. On the other hand, in the single ignition mode, the excessive increase in the combustion speed of a gaseous mixture in the combustion chamber 13 of the cylinder 11 is prevented, so that a noise such as a piston hammering sound is reduced.

Then, the ignition control unit 23 outputs an ignition signal to at least one of the ignition plugs 12A and 12B when the piston 14 is around a top dead center, on the basis of a crank angle signal from the crank angle sensor 25, to allow the ignition plugs 12A and 12B to be ignited.

The ignition modes described above to be performed by the ignition control unit 23 will be described further with reference to the flowchart of FIG. 3.

At the time of starting the engine, the ignition control unit 23 performs the double ignition mode in which the two ignition plugs 12A and 12B are simultaneously ignited (step S1). Next, the ignition control unit 23 determines whether a present engine speed N exceeds an idling engine speed N0 (N>N0) (step S2), and continues the double ignition mode if the present engine speed N is equal to or less than the idling engine speed N0 (N.ltoreq.N0) (step S1).

The ignition control unit 23 performs the single ignition mode in which any one of the ignition plugs 12A and 12B is ignited when the present engine speed N exceeds the idling engine speed N0 (N>N0) at the step S2 (step S3). Next, the ignition control unit 23 determines whether the present engine speed N becomes equal to or less than the idling engine speed N0 (N.ltoreq.N0) (step S4), and continues the single ignition mode when the present engine speed N exceeds the idling engine speed N0 (N>N0) (step S3), and performs the double ignition mode when the present engine speed N becomes equal to or less than the idling engine speed N0 (N.ltoreq.N0) (step S1).

According to the present first embodiment of the configuration and characters described above, the following effects (1) to (3) can be achieved.

(1) Since the ignition control unit 23 in the ignition control device 30 for the engine allows the two ignition plugs 12A and 12B to be simultaneously ignited during the idling operation of the engine 10, the combustion speed of a gaseous mixture is increased in the combustion chamber 13 in each of the cylinders 11. As a result, the amount of non-combustion gas is reduced, thus improving the clean-up performance of exhaust gas during the idling operation of the engine 10.

(2) Since the ignition control unit 23 in the ignition control device 30 for the engine allows any one of the ignition plugs 12A and 12B to be ignited in a state other than idling operation of the engine 10, it is possible to prevent the excessive increase in the combustion speed of the gaseous mixture in the combustion chamber 13 in each of the cylinders 11 as compared with the case where the two ignition plugs 12A and 12B are simultaneously ignited. Thus, it is possible to reduce a noise such as a piston hammering sound, occurring during the acceleration of the engine at the time of starting, for example.

(3) Since the piston hammering sound and the like are reduced in a state other than the idling operation of the engine 10, the following advantageous effects can be achieved.

3-1) It is not necessary to increase viscosity of lubricant to reduce the piston hammering sound, so that a lubricant with low viscosity can be used. As a result, mechanical loss in the whole of the engine 10 can be reduced, thereby achieving the high efficiency of the engine 10.

3-2) It is possible to reduce strength of a piston pin, and as a result, a cost of the piston pin can be reduced.

3-3) It is possible to prevent a skirt portion of the piston 14 from rattling, and accordingly, a clearance between the piston 14 and the cylinder 11 can be increased. As a result, it is possible to improve the seizure resistance of the engine 10 as well as to reduce the mechanical loss.

3-4) It is possible to reduce rigidity of the skirt portion of the piston 14, and as a result, friction between the piston 14 and the cylinder 11 can be reduced.

Further, in a modification of the above first embodiment, It may be possible that the idling engine speed N0 at the steps S2 and S4 in FIG. 3 is set at a different value to use hysteresis setting so that chattering is prevented. In addition, in a case where three or more ignition plugs are provided for each of the cylinders 11, part of the ignition plugs, e.g. two or one of the three plugs, may be ignited in a state other than the engine idling operation.

Hereunder, another (i.e., second) embodiment of the present invention will be explained with reference to FIGS. 4 to 6. Further, it is to be noted that elements or units described for this second embodiment are added with the same reference numerals as those added to the first embodiment shown in FIG. 1, and duplicated explanations thereof are simplified or omitted hereunder, and substantially the same operation or function of the engine as those in the first embodiment with respect to the general engine operation mode is performed.

The following configuration, an ignition control unit 30 of the engine of this second embodiment differs from that of the first embodiment.

That is, the exhaust pipe 17 is communicated with a clean side of the air cleaner box 19 through a secondary air supply device 27 as a secondary air supply means. The secondary air supply device 27 is provided with a control valve 29 so as to achieve a function for supplying a fresh air as the secondary air from the air cleaner box 19 to the exhaust pipe 17 or stopping the air supply thereto on the basis of the engine speed and the throttle opening.

According to the operation of this second embodiment, since the engine 10 has a reduced intake speed at the low operation speed, it is liable to generate non-combustion gas such as HC or CO. The secondary air supply device 27, operates the control valve 29 to be opened at the low engine speed period to thereby supply the secondary air into the exhaust pipe 17 to again burn the non-combustion gas.

The throttle valve body 18 is provided with a throttle opening detecting sensor 22 for detecting the opening of the throttle valve 20 as in the first embodiment, and the degree of opening of the throttle valve 20 detected by the throttle opening detecting sensor 22 is sent to the ignition control unit 23 as a throttle opening signal.

In addition, as like as in the first embodiment, a crank angle sensor 25 detects a crank angle indicated as a rotation angle of the crank shaft 15. The crank angle sensor 25 is also called an engine speed sensor. A crank rotor 26 is coupled to the crank shaft 15 so as to rotate integrally therewith. Although the crank rotor 26 is provided, at an outer periphery thereof, with a plurality of teeth (not shown) at intervals of a predetermined crank angle (30.degree., for example), one of the teeth is missing. The crank angle sensor 25 detects the teeth of the crank rotor 26 rotating with the crank shaft 15 to detect a crank angle and an engine speed of the crank shaft 15. Signals of the crank angle and the engine speed detected by the crank angle sensor 25 are transmitted to the ignition control unit 23.

The ignition control unit 23, the sensors (i.e., the throttle opening sensor 22 and the crank angle sensor 25), and the secondary air supply device 27, described above, constitute an ignition control device 30 for the engine.

The ignition control unit 23 of the ignition control device 30 for the engine allows the secondary air supply device 27 to operate to supply secondary air to the exhaust pipe 17 when both of the engine speed detected by the crank angle sensor 25 and the throttle opening detected by the throttle opening sensor 22 are equal to or less than a specified value (step S16 in FIG. 6 described later), and then performs the double ignition mode in which the two ignition plugs 12A and 12B are simultaneously ignited.

In addition, the ignition control unit 23 stops the secondary air supply device 27 to stop the supply of the secondary air to the exhaust pipe 17 when both of the engine speed and the throttle opening, described above, are more than the specified value (step S13 in FIG. 6 described later), and then performs the single ignition mode in which airy one of the ignition plugs 12A and 12B is ignited.

Figure 5A:
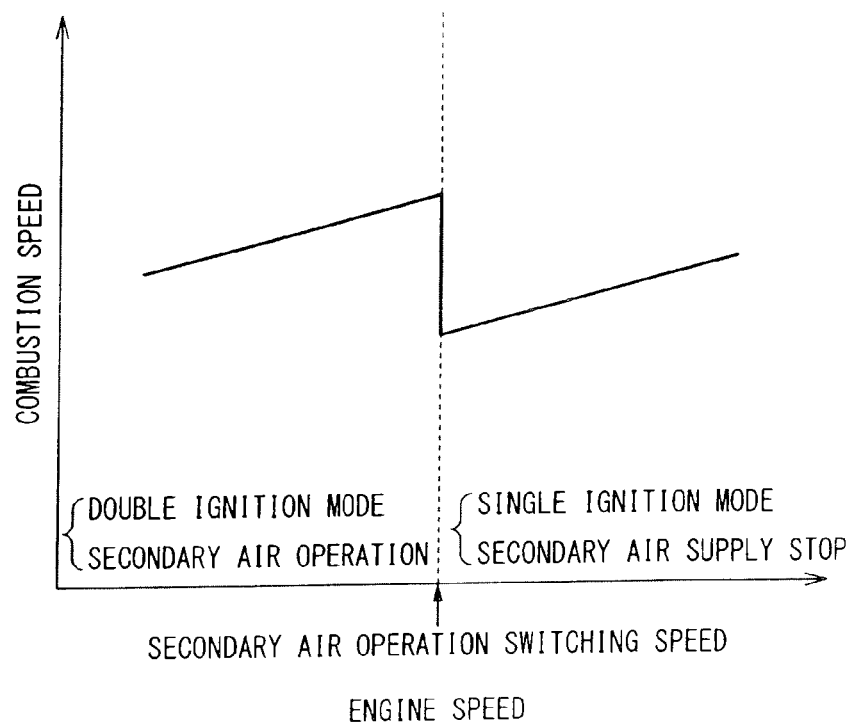
FIG. 5A is a graph representing a relationship between combustion speed and engine speed.
Figure 5B:
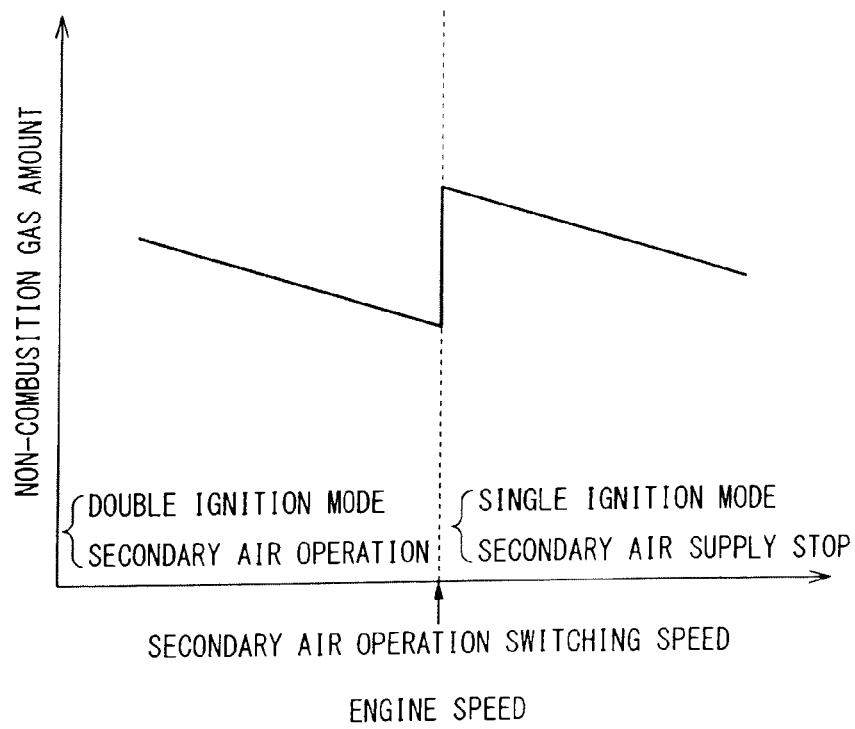
FIG. 5B is a graph representing a relationship between the amount of non-combustion gas and the engine speed.

In the double ignition mode, as shown in FIG. 5, as a combustion speed of a gaseous mixture increases in the combustion chamber 13 of the cylinder 11, the amount of non-combustion gas decreases. Thus, clean-up of exhaust gas is promoted. In addition, in the single ignition mode, there is prevented an excessive increase in a combustion speed of a gaseous mixture in the combustion chamber 13 of the cylinder 11, so that a noise such as a piston hammering sound is reduced.

Figure 4:
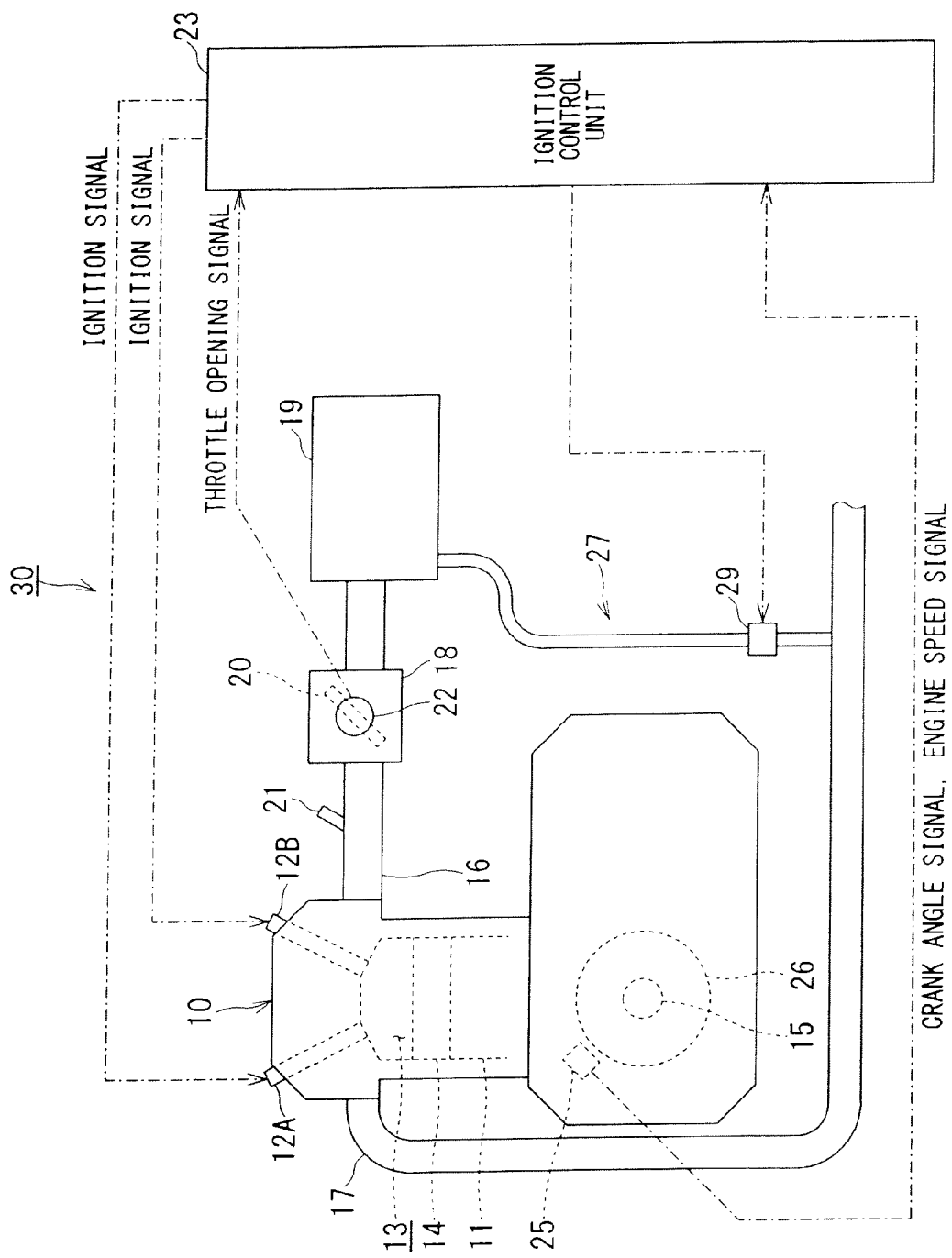
FIG. 4 is a block diagram showing another embodiment of an ignition control device for an engine in accordance with the present invention.

The ignition control unit 23 shown in FIG. 4 outputs an ignition signal to at least one of the ignition plugs 12A and 12B when the piston 14 is around a top dead center, on the basis of a crank angle signal from the crank angle sensor 25, to allow the ignition plugs 12A and 12B to be ignited.

The ignition modes described above to be performed by the ignition control unit 23 will be described further with reference to FIG. 6.

At the time of starting the engine 10, the ignition control unit 23 allows the secondary air supply device 27 to operate to supply a part of intake air in the intake pipe 16 as secondary air to the exhaust pipe 17 (step S11), as well as performs the double ignition mode in which the two ignition plugs 12A and 12B are simultaneously ignited (step S12).

In the next step, the ignition control unit 28 determines whether the present engine speed N is more than a specified engine speed N1 (N>N1), and the present throttle opening M is more than a specified throttle opening M1 (M>M1) (step S13), and continues both of the secondary air supply and the double ignition mode when the present engine speed N is equal to or less than the specified engine speed N1 (N.ltoreq.N1) or the present throttle opening M is equal to or less than the specified throttle opening M1 (M.ltoreq.M1) (step S11, S12).

The ignition control unit 23 stops the supply of the secondary air to the exhaust pipe 17 by the secondary air supply device 27 (step S14) and performs the single ignition mode in which any one of the ignition plugs 12A and 12B is ignited (step S15) when the present engine speed N is more than a specified engine speed N1 (N>N1), and the present throttle opening M is more than a specified throttle opening M1 (M>M1) at the step S13.

Next, the ignition control unit 23 determines whether the present engine speed N is equal to or less than a specified engine speed N1 (N.ltoreq.N1), and the present throttle opening M is equal to or less than a specified throttle opening M1 (M.ltoreq.M1) (step S16), and continues both the stop of the secondary air supply and the single ignition mode when the present engine speed N is more than the specified engine speed N1 (N>N1) or the present throttle opening M is more than the specified throttle opening M1 (M>M1) (step S14, S15).

In the step S16, the ignition control unit 23 performs the supply of the secondary air by the secondary air supply device 27 and the double ignition mode of the ignition plugs 12A and 12B when the present engine speed N is equal to or less than a specified engine speed N1 (N.ltoreq.N1), and the present throttle opening M is equal to or less than a specified throttle opening M1 (M.ltoreq.M1) (step S11, S12).

According to the present second embodiment of the configuration and operation described above, the following effects and/or advantageous functions (1) to (3) will be achieved.

(1) Since the ignition control unit 23 in the ignition control device 30 for the engine allows the two ignition plugs 12A and 12B to be simultaneously ignited when the secondary air supply device 27 supplies secondary air to the exhaust pipe 17, a combustion speed of a gaseous mixture in the combustion chamber 13 of the cylinder 11 increases, thus reducing the non-combustion gas, and hence, the ignition control device 30 for the engine assists clean-up of exhaust gas by using the secondary air when the secondary air is supplied, at a time, for example, when the engine 10 runs at low speed, thus improving the clean-up performance of exhaust gas.

(2) The ignition control unit 23 in the ignition control device 30 for the engine allows any one of the ignition plugs 12A and 12B to be ignited when the secondary air supply device 27 stops the supply of the secondary air to the exhaust pipe 17. Accordingly, the ignition control device 30 for the engine can prevent the excessive increase in a combustion speed due to simultaneous ignition of the two ignition plugs 12A and 12B when the supply of the secondary air is stopped, at a time, for example, when the engine 10 runs at high speed. As a result, it is possible to reduce a noise such as a piston hammering sound.

(3) The piston hammering sound and the like are reduced when the supply of the secondary air to the exhaust pipe 17 is stopped, at a time, for example, when an engine runs at high speed.

Accordingly, the following advantageous effects will be achieved.

3-1) It is not necessary to increase viscosity of lubricant for reducing the piston hammering sound, so that a lubricant with low viscosity can be used. As a result, mechanical loss in the whole of the engine 10 can be reduced, thereby achieving the high efficiency of the engine 10.

3-2) It is possible to reduce the strength of the piston pin. As a result, a cost of the piston pin can be reduced.

3-3) It is possible to prevent a skirt portion of the piston 14 from rattling. Accordingly, it is possible to increase a clearance between the piston 14 and the cylinder 11. As a result, it is possible to improve seizure resistance of the engine 10 as well as to reduce mechanical loss.

3-4) It is possible to reduce rigidity of the skirt portion of the piston 14. As a result, friction between the piston 14 and the cylinder 11 can be reduced.

The present second embodiment may also include preferable modification and/or changes.

Figure 6:
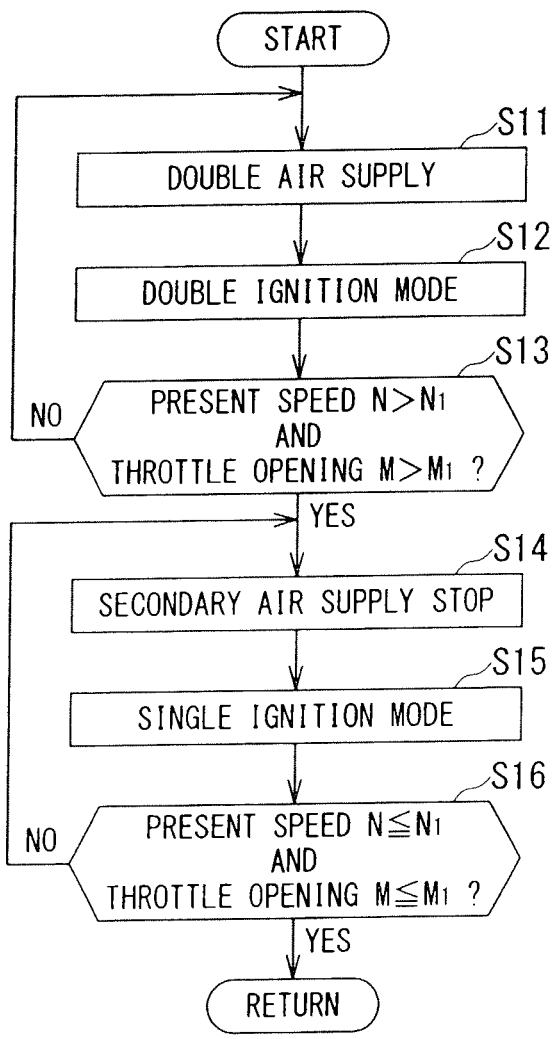
FIG. 6 is a flow chart showing an ignition operation controlled by an ignition control unit shown in FIG. 1.
Figure 7:
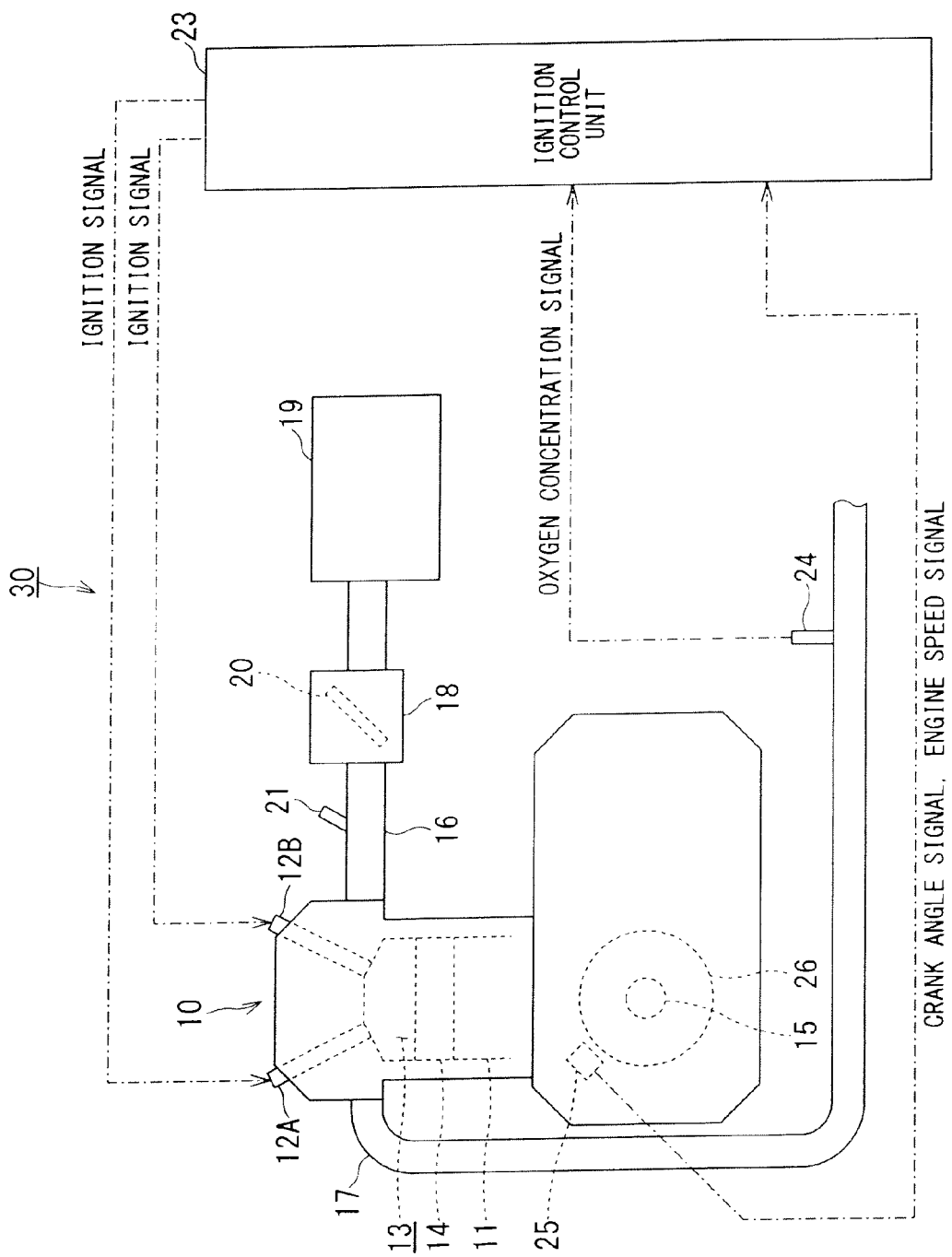
FIG. 7 is a block diagram showing a further embodiment of an ignition control device for an engine in accordance with the present invention.

For example, each of the predetermined engine speed N1 and the predetermined throttle opening M1 in FIG. 6 may be set at a different value at the steps S13 and S16 to use hysteresis setting so that chattering is prevented. In addition, in a case where three or more ignition plugs are provided for each of the cylinders 11, when supply of the secondary air is stopped, part of the ignition plugs, e.g., two or one of the three plugs, may be ignited.

Hereunder, a further (i.e., third) embodiment of the present invention will be explained with reference to FIGS. 7 to 10. Further, if is to be noted that elements or units described for this second embodiment are added with the same reference numerals as those added to the first and/or second embodiment shown in FIG. 1 and/or FIG. 4, and duplicated explanations thereof are simplified or omitted hereunder, and substantially the same operation or function of the engine as those in the first embodiment with respect to the general engine operation mode is performed.

The following configuration, an ignition control unit 30 of the engine of this third embodiment differs from those of the first and/or second embodiments.

That is, the exhaust pipe 17 is not directly communicated with a clean side of the air cleaner box 19, but the exhaust pipe 17 is provided with an oxygen concentration sensor 24 from which a detected oxygen concentration signal is transmitted to the ignition control unit 23.

More specifically, the exhaust pipe 17 is provided with an oxygen concentration sensor 24 for detecting oxygen concentration in the exhaust gas. A detection value detected by the oxygen concentration sensor 24 is transmitted to the ignition control unit 23 as an oxygen concentration signal.

Figure 8A:
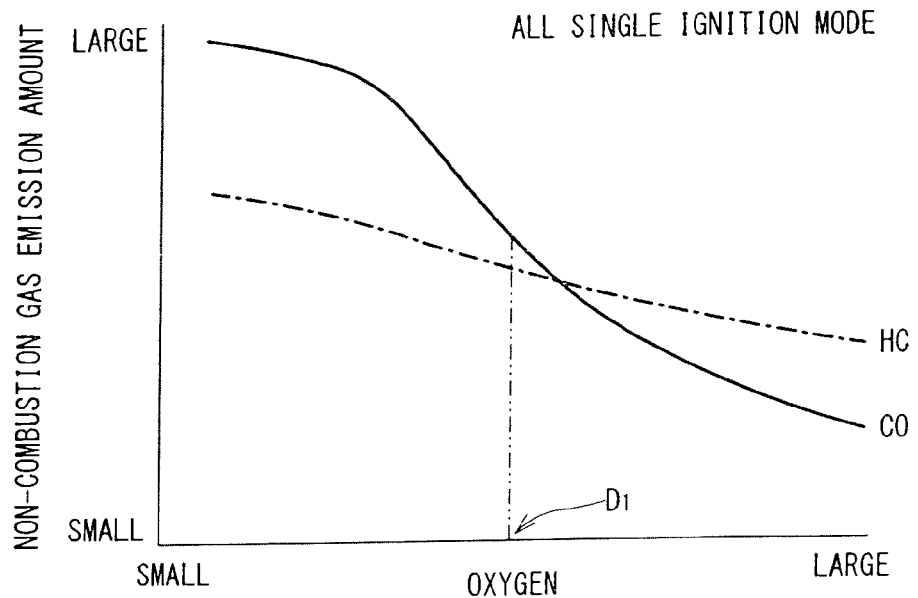
FIG. 8A is a graph representing the relationship in a single ignition mode.

In this operation, if the exhaust gas has a low oxygen concentration less than a specified value D1, proper combustion is not achieved in the combustion chamber 13. As a result, the amount of non-combustion gas (such as HC and CO) increases as shown in FIG. 8A, which results in reduction in a clean-up rate of the exhaust gas.

In general, in order to reduce the non-combustion gas described above, the fuel injection device 21 adjusts fuel injection quantity or a secondary air supply device, not shown, is operated to supply fresh air obtained from the air cleaner box 19 to the exhaust pipe 17 as secondary air.

In addition, as like as the former embodiments, a crank angle sensor 25 detects a crank angle indicated as a rotation angle of the crank shaft 15. The crank angle sensor 25 is also called an engine speed sensor. A crank rotor 25 is coupled to the crank shaft 15 so as to rotate integrally therewith. Although the crank rotor 26 is provided, at an outer periphery thereof, with a plurality of teeth, not shown, at intervals of a predetermined crank angle (30.degree., for example), one of the teeth is missing. The crank angle sensor 25 detects the teeth of the crank rotor 26 rotating with the crank shaft 15 to detect the crank angle and the engine speed of the crank shaft 15. Signals of the crank angle and the engine speed detected by the crank angle sensor 25 are transmitted to the ignition control unit 23.

In this third embodiment, the ignition control unit 23, the oxygen concentration sensor 24 and the crank angle sensor 25 constitute an ignition control device 30 for the engine.

Figure 8B:
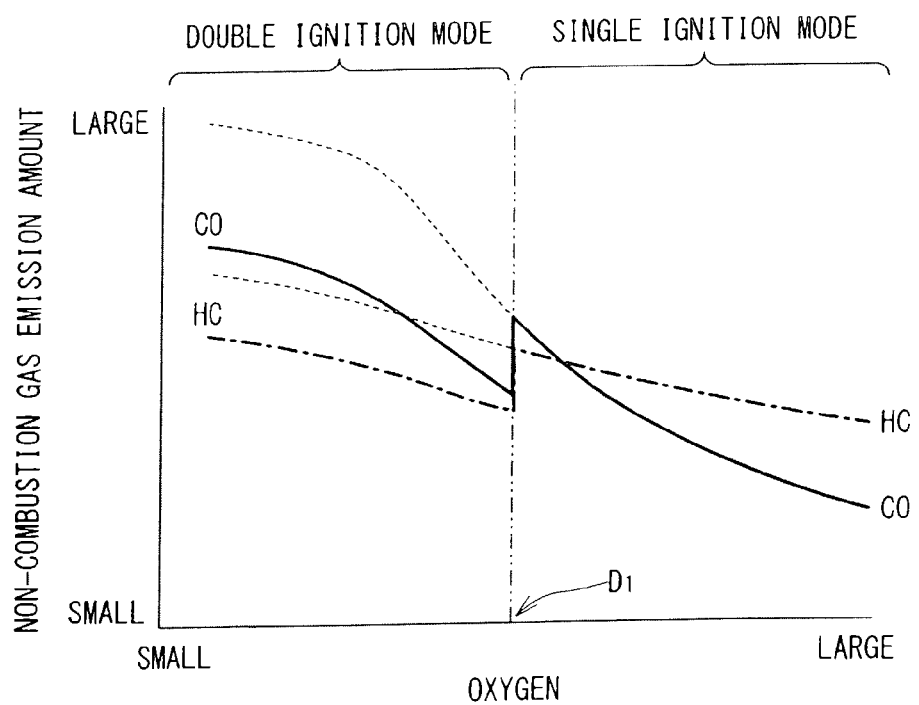
FIG. 8B is a graph representing the relationship in a case where the single ignition mode and a double ignition mode are combined.

The ignition control unit 23 in the ignition control device 30 for the engine of the present embodiment, as shown in FIG. 8B, performs the double ignition mode in which the two ignition plugs 12A and 12B are simultaneously ignited, if the oxygen concentration detected by the oxygen concentration sensor 34 is less than the specified value D1, and also performs the single ignition mode in which any one of the ignition plugs 12A and 12B is ignited, if the oxygen concentration is equal to or more than the specified value D1.

When the double ignition mode is performed, the combustion speed of a gaseous mixture is increased in the combustion chamber 13 of the cylinder 11, and the combustion is hence accelerated. As a result, possibility of an occurrence of non-combustion gas is reduced.

In the single ignition mode, since the excessive increase in a combustion speed of a gaseous mixture in the combustion chamber 13 of the cylinder 11 is prevented, a noise such as a piston hammering sound is reduced. Further, in FIG. 8B, a broken line shows the amount of the emission of the non-combustion gas in a case when the single ignition mode is performed with the oxygen concentration being less than the specified value D1.

The ignition control unit 33 outputs an ignition signal to at least one of the ignition plugs 12A and 12B at a time when the piston 14 is around a top dead center, on the basis of a crank angle signal from the crank angle sensor 25, to allow the ignition plugs 12A and 12B to be ignited.

Figure 9:
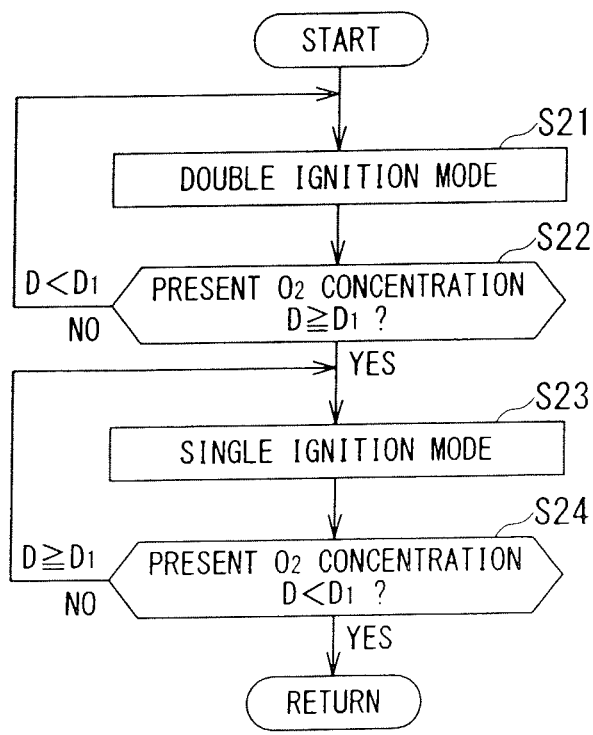
FIG. 9 is a flow chart showing an example of an ignition operation in an ignition mode, controlled by an ignition control unit shown in FIG. 7.

The ignition modes described above to be performed by the ignition control unit 23 will be described with reference to FIGS. 9 and 10, in which FIG. 9 is a flowchart of an ignition operation in a state where the oxygen concentration sensor 24 outputs oxygen concentration with a numeric value, and FIG. 4 is also a flowchart of an ignition operation in a state where the oxygen concentration sensor 24 defines oxygen concentration equal to or more than the specified value D1 as high concentration to output an on-signal, and defines oxygen concentration less than the specified value D1 as low concentration to output an off-signal.

As shown in FIG. 9, the ignition control unit 23 performs the double ignition mode in which the two ignition plugs 12A and 12B are simultaneously ignited at the time of starting the engine 10 (step S21). Next, the ignition control unit 23 determines whether present oxygen concentration D in the exhaust gas is equal to or more than the specified value D1 (D.gtoreq.D1) (step S22), and continues the double ignition mode if the present oxygen concentration D is less than the specified value D1 (D<D1) (step S21).

Then, the ignition control unit 23 performs (step S23) the single ignition mode in which any one of the ignition plugs 12A and 12B is ignited when the present oxygen concentration D becomes equal to or more than the specified value D1 (D.gtoreq.D1) at the step S22. Next, the ignition control unit 23 determines whether the present oxygen concentration D becomes less than the specified value D1 (D<D1) (step S24), and continues the single ignition mode when the present oxygen concentration D is equal to or more than the specified value D1 (D.gtoreq.D1) (step S23), and performs the double ignition mode when the present oxygen concentration D becomes less than the specified value D1 (D<D1) (step S21).

Figure 10:
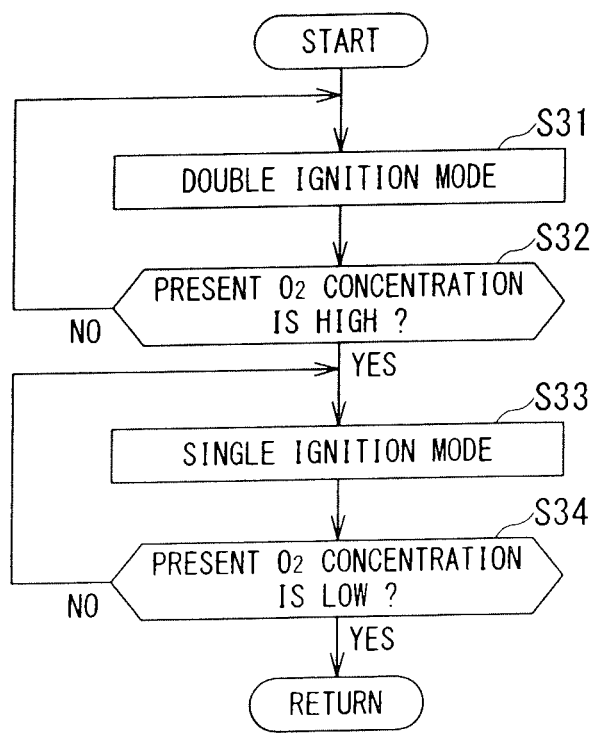
FIG. 10 is a flow chart showing another example of an ignition operation in an ignition mode, controlled by the ignition control unit shown in FIG. 7.

Furthermore, as shown in FIG. 10, the ignition control unit 23 performs the double ignition mode in which the two ignition plugs 12A and 12B are simultaneously ignited at the time of starting the engine 10 (step S31). Next, the ignition control unit 23 determines whether the present oxygen concentration D in the exhaust gas is the high concentration (step S32) and continues the double ignition mode when the present oxygen concentration D is not the high concentration but the low concentration (step S31).

Then, the ignition control unit 23 performs (step S33) the single ignition mode in which any one of the ignition plugs 12A and 12B is ignited when the present oxygen concentration D becomes the high concentration at the step S32. Next, the ignition control unit 23 determines whether the present oxygen concentration D becomes the low concentration (step S34) and continues the single ignition mode when the present oxygen concentration D is not the low concentration but the high concentration (step S33), and performs the double ignition mode when the present oxygen concentration D becomes the low concentration (step S31).

According to the preset third embodiment of the configuration and operation described above, the following effects and/or advantageous effects (1) to (4) can be achieved.

(1) When the oxygen concentration in exhaust gas in the exhaust pipe 17, detected by the oxygen concentration sensor 24, is less than the specified value D1, the ignition control unit 23 in the ignition control device 30 for the engine of the present embodiment allows the two ignition plugs 12A and 12B to be simultaneously ignited, and accordingly, the combustion speed of the gaseous mixture is increased in the combustion chamber 13 of the cylinder 11, so that the combustion is accelerated. As a result, even if the oxygen concentration is low. It is possible to reduce the non-combustion gas. Thus, the clean-up performance of the exhaust gas can be improved with the fuel injection device 21 controlling fuel injection quantity to a minimum.

In addition, since non-combustion gas in exhaust gas in the exhaust pipe 17 is reduced as described above, it is possible to eliminate the secondary air supply device for supplying secondary air to the exhaust pipe 17, thereby reducing the non-combustion gas.

(2) In a case where the double ignition mode, in which the two ignition plugs 12A and 12B are simultaneously ignited, is performed, since the combustion speed of the gaseous mixture in the combustion chamber 13 of the cylinder 11 is increased, it is possible to rapidly raise the temperature in the engine 10. As a result, the fuel injection quantity from the fuel injection device 21 can be reduced to thereby improve the fuel consumption of the engine 10.

(3) When the oxygen concentration in exhaust gas in the exhaust pipe 17 detected by the oxygen concentration sensor 24 is equal to or more than the specified value D1, the ignition control unit 23 in the ignition control device 30 for the engine performs the single ignition mode, in which any one of the ignition plugs 12A and 12B is ignited. As a result, the excessive increase in the combustion speed of the gaseous mixture in the combustion chamber 13 of the cylinder 11 is suppressed as compared with a case where the two ignition plugs 12A and 12B are simultaneously ignited, thus reducing a noise such as the piston hammering sound.

(4) The piston hammering sound and the like are reduced when oxygen concentration in exhaust gas in the exhaust pipe 17 is equal to or more than the specified value D1, the following advantageous effects can be achieved.

4-1) It is not necessary to increase viscosity of lubricant to reduce the piston hammering sound, so that a lubricant with low viscosity can be used. As a result, a mechanical loss in the whole of the engine 10 can be reduced to thereby realize the high efficiency of the engine 10.

4-2) It is possible to reduce strength of a piston pin, and hence, a cost of the piston pin can be reduced.

4-3) It is possible to prevent a skirt portion of the piston 14 from rattling, and accordingly, the clearance between the piston 14 and the cylinder 11 can be increased. As a result, the seizure resistance of the engine 10 can be improved, and the mechanical loss can be also reduced.

4-4) It is possible to reduce rigidity of the skirt portion of the piston 14, and as a result, friction between the piston 14 and the cylinder 11 can be reduced.

The present third embodiment may also include preferable modification and/or changes.

For example, the specified value D1 at the steps S22 and S24 in FIG. 9 may be set at a different value to use hysteresis setting so that chattering is prevented. In addition, in a case where three or more ignition plugs are provided for each of the cylinders 11, when the oxygen concentration detected by the oxygen concentration sensor is equal to or more than a specified value, part of the ignition plugs, e.g. two or one of the three plugs, may be ignited.

It is further to be noted that the present invention is not limited to the described embodiments, and many other changes and modifications or alternations such as mentioned hereinbefore may be made without departing from the scopes of the appended claims.

What is claimed is:

1. An ignition control device for an engine provided with a plurality of ignition plugs for each cylinder, the ignition control device comprising:
   an oxygen concentration sensor that detects oxygen concentration in exhaust gas of the engine; and
   an ignition control unit that controls the plurality of ignition plugs to be simultaneously ignited when the oxygen concentration detected by the oxygen concentration sensor is less than a specified value.

2. The ignition control device of claim 1, wherein the ignition control unit controls part of the plurality of ignition plugs to ignite when the oxygen concentration detected by the oxygen concentration sensor is equal to or more than the specified value.

3. The ignition control device of claim 1, wherein two ignition plugs for each cylinder, and the ignition control unit that controls the two ignition plugs to be simultaneously ignited when the oxygen concentration detected by the oxygen concentration sensor is less than a specified value.

4. The ignition control device of claim 3, wherein the ignition control unit controls one of the two ignition plugs to be ignited when the oxygen concentration detected by the oxygen concentration sensor is equal to or more than the specified value.

* * * * *